US010218716B2

(12) United States Patent
Huang et al.

(10) Patent No.: US 10,218,716 B2
(45) Date of Patent: Feb. 26, 2019

(54) TECHNOLOGIES FOR ANALYZING UNIFORM RESOURCE LOCATORS

(71) Applicant: Intel Corporation, Santa Clara, CA (US)

(72) Inventors: Yonghong Huang, Portland, OR (US); Jason Martin, Beaverton, OR (US); Micah J. Sheller, Hillsboro, OR (US); Cory Cornelius, Portland, OR (US); Shih-han Wang, Taipei (TW)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 15/283,389

(22) Filed: Oct. 1, 2016

(65) Prior Publication Data

US 2018/0097822 A1 Apr. 5, 2018

(51) Int. Cl.
*H04L 29/06* (2006.01)
*G06N 99/00* (2019.01)
*G06F 21/56* (2013.01)
*G06F 21/57* (2013.01)

(52) U.S. Cl.
CPC ........ *H04L 63/1408* (2013.01); *G06F 21/562* (2013.01); *G06F 21/57* (2013.01); *G06N 99/005* (2013.01)

(58) Field of Classification Search
CPC ..... H04L 63/1408; G06N 3/08; G06N 3/0445
See application file for complete search history.

(56) References Cited

U.S. PATENT DOCUMENTS

| 8,521,667 | B2 * | 8/2013 | Zhu | H04L 63/1408 706/13 |
| 9,043,894 | B1 * | 5/2015 | Dennison | G06F 21/552 726/11 |
| 9,178,901 | B2 * | 11/2015 | Xue | H04L 63/1483 |
| 2007/0079379 | A1 * | 4/2007 | Sprosts | G06Q 10/107 726/24 |
| 2007/0271613 | A1 * | 11/2007 | Joyce | G06F 21/552 726/23 |
| 2008/0133540 | A1 * | 6/2008 | Hubbard | H04L 63/101 |

(Continued)

OTHER PUBLICATIONS

Miller, Brad, et al., "Back to the Future: Malware Detection with Temporally Consistent Labels," UC Berkeley, International Computer Science Institute, Oct. 26, 2015, 12 pages.

*Primary Examiner* — Mahfuzur Rahman
(74) *Attorney, Agent, or Firm* — Barnes & Thornburg LLP

(57) ABSTRACT

Technologies for analyzing a Uniform Resource Locator (URL) include a multi-stage URL analysis system. The multi-stage URL analysis system analyzes the URL using a multi-stage analysis. In the first stage, the multi-stage URL analysis system analyzes the URL using an ensemble lexical analysis. In the second stage, the multi-stage URL analysis system analyzes the URL based on third-party detection results. In the third stage, the multi-stage URL analysis system analyzes the URL based on metadata related to the URL. The multi-stage URL analysis system advances the stages of analysis if a malicious classification score determined by each stage does not satisfy a confidence threshold. The URL may also be selected for additional rigorous analysis using selection criteria not used in by the analysis stages.

22 Claims, 7 Drawing Sheets

(56) References Cited

U.S. PATENT DOCUMENTS

| | | | |
|---|---|---|---|
| 2012/0158626 A1* | 6/2012 | Zhu | G06F 21/56 706/13 |
| 2014/0298460 A1* | 10/2014 | Xue | H04L 63/1425 726/23 |
| 2015/0215326 A1* | 7/2015 | Baddour | G06F 17/30864 726/22 |

* cited by examiner

TECHNOLOGIES FOR ANALYZING UNIFORM RESOURCE LOCATORS

BACKGROUND

A Uniform Resource Locator (URL), often referred to as a "web address," identifies a resource accessible via the World Wide Web. Some URLs, however, may direct users to malicious content. URL analysis systems utilize various security techniques to identify malicious URLs (i.e., URLs identifying web resources including malicious content). One goal of malicious URL analysis is to identify the malicious URLs prior to a user visiting the web resource identified by the malicious URL or otherwise downloading content from such web resource. However, identifying malicious URLs can be difficult due to the dynamic content of many web resources and the often short lifespan of a malicious URL. As such, typical URL analysis systems often struggle to keep up with the growing number of URLs requiring analysis.

Typical URL analysis systems often use various analysis techniques including, for example, maintaining "blacklists" that identify known malicious URLs. However, maintaining "blacklists" and corresponding "whitelists" is time intensive and fails to include all known malicious URLs at any given point in time due to the transient nature of malicious URLs. In other URL analysis systems, the content located at the web resource identified by the URL may be analyzed. Again, such analysis, especially when done in real-time, is time and resource intensive and can expose a user to potential threats. Additionally, some analysis systems identify malicious URLs based on non-content analysis using human-crafted rules. Such analysis systems, however, are difficult to scale and less agile to new or emerging threats.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
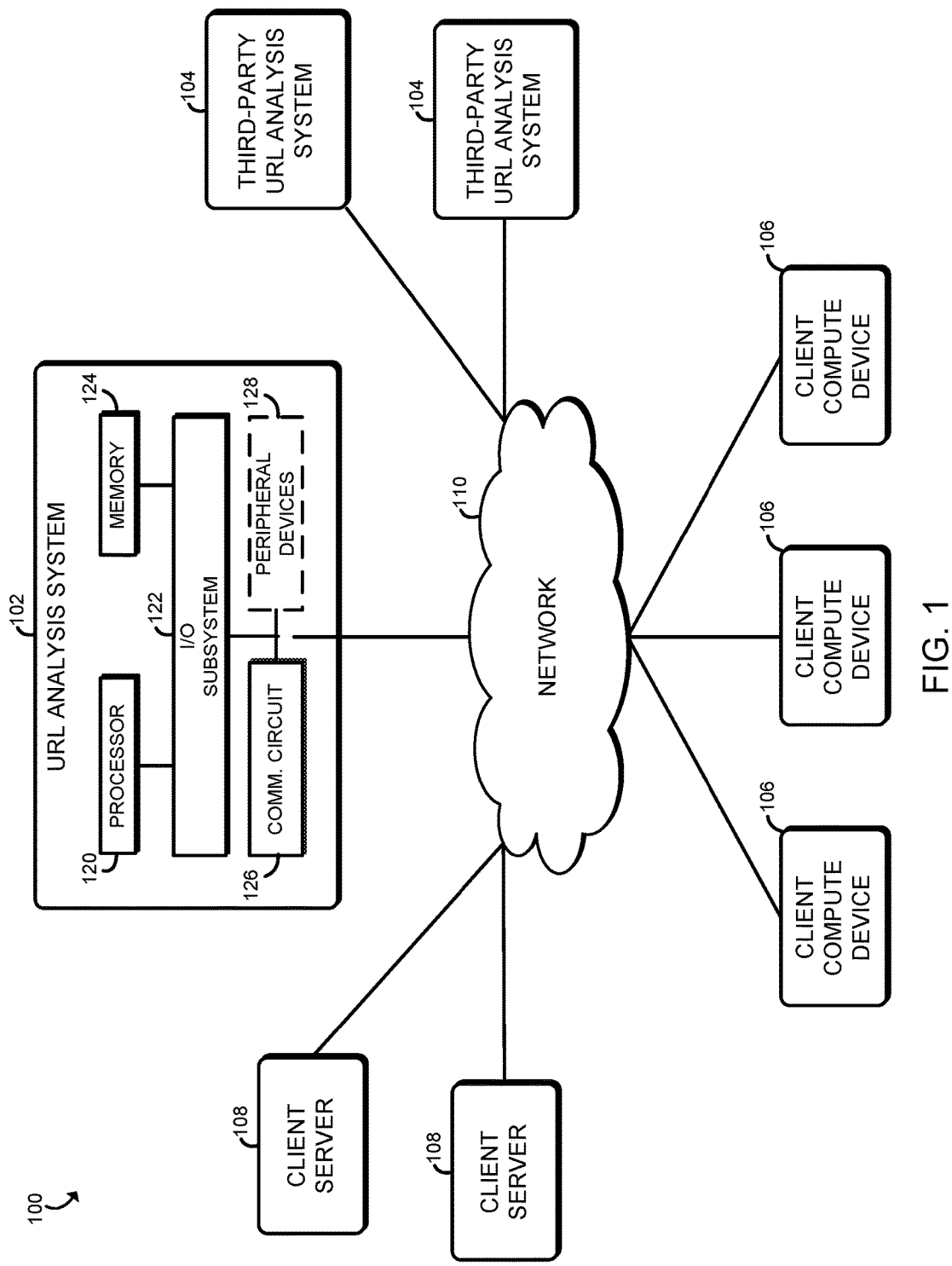
FIG. 1 is a simplified block diagram of at least one embodiment of a system for detecting malicious uniform resource locators (URLs)

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for detecting malicious Uniform Resource Locators (URLs) includes a URL analysis system 102, which may communicate with various third-party URL analysis systems 104, client compute devices 106, and/or client servers 108 over a network 110. In use, as discussed in more detail below, the URL analysis system 102 is configured to analyze URLs using a multi-stage URL analysis workflow. To do so, in the illustrative embodiment, the URL analysis system 102 initially analyzes a URL in question using an ensemble lexical analysis. That is, the URL analysis system 102 analyses the URL using multiple lexical analysis algorithms or techniques. For example, in the illustrative embodiment, the URL analysis system 102 analyzes the URL by performing each of a natural language processing analysis, a deep learning analysis, and a non-parametric analysis on the URL. The URL analysis system 102 determines a first-stage malicious URL classification score based on the multiple lexical analysis. As discussed below, the malicious URL classification score is indicative of a probability or likelihood that the URL is malicious. If the first-stage malicious URL classification score satisfies a confidence threshold (e.g., is within a confidence range of an absolute malicious score or absolute not-malicious score), the URL analysis system 102 may determine the maliciousness of the URL based on the first-stage malicious score.

If, however, the first-stage malicious URL classification score does not satisfy the confidence threshold, the URL analysis system 102 performs a second-stage analysis on the URL. During the second-stage analysis, the URL analysis system 102 analyzes the URL based on third-party malicious URL detection results harvested or otherwise obtained from one or more of the third-party URL analysis systems 104. The third-party malicious URL detection results may be embodied as an aggregation of malicious URL detection analysis and associated results harvested from many third-party URL analysis systems 104. The third-party malicious URL detection results may be embodied as any type of data or information related to, or otherwise relevant to, the URL and from which the maliciousness of the URL may be determined or inferred. For example, in some embodiments, the third-party malicious URL detection results may be embodied as malicious URL classification scores similar to the scores produced in the various stages of the multi-stage URL analysis performed by the URL analysis system 102. In the second-stage analysis, the URL analysis system 102 determines a second-stage malicious URL classification score for the URL based on the third-party malicious URL detection results. If the second-stage malicious URL classification score satisfies the confidence threshold, the URL analysis system 102 may determine the maliciousness of the URL based on the second-stage malicious score.

If, however, the second-stage malicious URL classification score does not satisfy the confidence threshold, the URL analysis system 102 performs a third-stage analysis on the URL. During the third-stage analysis, the URL analysis system 102 analyzes the URL based on URL metadata related to the URL. That is, the URL analysis system 102 performs local analysis on the URL metadata, which may be embodied as any type of data related to the URL and from which the maliciousness of the URL may be determined or inferred. For example, in some embodiments, the URL metadata may include an identity of the Internet Protocol (IP) address corresponding to the URL, an identity of a company associated with the URL, an indication of the popularity of the URL, and/or other data related to the URL and from which the maliciousness of the URL may be determined or inferred. In the third-stage analysis, the URL analysis system 102 determines a third-stage malicious URL classification score for the URL based on the URL metadata. If the third-stage malicious URL classification score satisfies the confidence threshold, the URL analysis system 102 may determine the maliciousness of the URL based on the third-stage malicious score.

It should be appreciated that the analysis performed at each analysis stage increases in complexity, computational intensity, and/or analysis time. However, it should also be appreciated that each stage "filters" out some number of URLs by identifying those URLs as malicious or not malicious, such that later analysis stages operate on a smaller sub-set of URLs. As such, the overall computational intensity and/or analysis time to analyze a group of URLs is reduced. Of course, although the URL analysis system 102 performs a three-stage analysis in the illustrative embodiment, the URL analysis system 102 may perform additional stages of analysis in other embodiments. Additionally, in some embodiments as discussed in more detail below, the URL analysis system 102 may select URLs for additional, more rigorous analysis (e.g., web resource content analysis) based on particular selection criteria, which are not used in the multi-stage URL analysis to determine the maliciousness of the URL. Because the selection criteria is not used in the determination of maliciousness, additional or other selection criteria may be considered as discussed below.

The URL analysis system 102 may be embodied as any type of compute device or collection of compute devices capable of analyzing a URL and performing the functions described herein. For example, the URL analysis system 102 may be embodied as, without limitation, one or more server computers, distributed computing systems, workstations, computers, desktop computers, laptop computers, notebook computers, tablet computers, mobile computing devices, network appliances, web appliances, processor-based systems, consumer electronic device, and/or other compute devices. As such, it should be appreciated that although shown in FIG. 1 as a single compute device, the URL analysis system 102 may be embodied as multiple compute devices (e.g., distributed compute devices) in other embodiments.

As shown in FIG. 1, the illustrative URL analysis system 102 includes a processor 120, an input/output ("I/O") subsystem 122, a memory 124, and a communication circuit 126. Of course, the URL analysis system 102 may include other or additional components, such as those commonly found in a typical server or compute device, in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the URL analysis system 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the URL analysis system 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the URL analysis system 102, on a single integrated circuit chip.

The communication circuit 126 may be embodied as any type of communication circuit, device, or collection thereof, capable of enabling communications between the URL analysis system 102 and other devices (e.g., the third-party URL analysis systems 104, the client compute devices 106, and/or the client servers 108). To do so, the communication circuit 126 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the URL analysis system 102 may also include one or more peripheral devices 128. The peripheral devices 128 may include any number of additional peripheral or interface devices, such as other input/output devices, storage devices, and so forth. The particular devices included in the peripheral devices 128 may depend on, for example, the type and/or configuration of the URL analysis system 102.

As discussed above, the URL analysis system 102 is configured to communicate with one or more third-party URL analysis systems 104 to retrieve or otherwise obtain third-malicious URL detection results, which may be generated and/or maintained by the corresponding third-party URL analysis system 104. Each third-party URL analysis system may be embodied as any type of computation or computer device capable of performing the functions described herein including, without limitation, a server, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. As such, each third-party URL analysis system 104 may include components commonly found in a server compute device such as processors, memory, I/O subsystems, communication circuits, and/or other devices. The description of such components of each third-party URL analysis system 104 is similar to the corresponding components of the URL analysis system 102 and it not repeated herein for clarity of the description. It should be appreciated that each third-party URL analysis system 104 may be embodied as a single compute device or a collection of distributed compute devices.

The system 100 also includes one or more client compute devices 106 and/or one or more client servers 108, each of which are configured to communicate with the URL analysis system 102 to obtain URL analysis of a URL. For example, in some embodiments, the URL analysis system may provide a web portal or application program interface (API) to the client compute devices 106 and/or client servers 108 to facilitate URL submission to the URL analysis system. For example, in some embodiments, the URL analysis system 102 may provide URL analysis support or services to other services provided by one of the client servers 108. Each of the client compute devices 106 and client servers 108 may be embodied as any type of computation or computer device capable of performing the functions described herein including, without limitation, a server, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. As such, each client compute device 106 and client server 108 may include components commonly found in a compute device such as processors, memory, I/O subsystems, communication circuits, and/or other devices. The description of such components of each client compute device 106 and client server 108 is similar to the corresponding components of the URL analysis system 102 and it not repeated herein for clarity of the description.

The network 110 may be embodied as any type of network capable of facilitating communications between the URL analysis system 102 and the other compute devices of the system 100. For example, the network 110 may be embodied as, or otherwise include, a wireless local area network (LAN), a wireless wide area network (WAN), a cellular network, and/or a publicly-accessible, global network such as the Internet. As such, the network 110 may include any number of additional devices, such as additional computers, routers, and switches, to facilitate communications thereacross.

Figure 2:
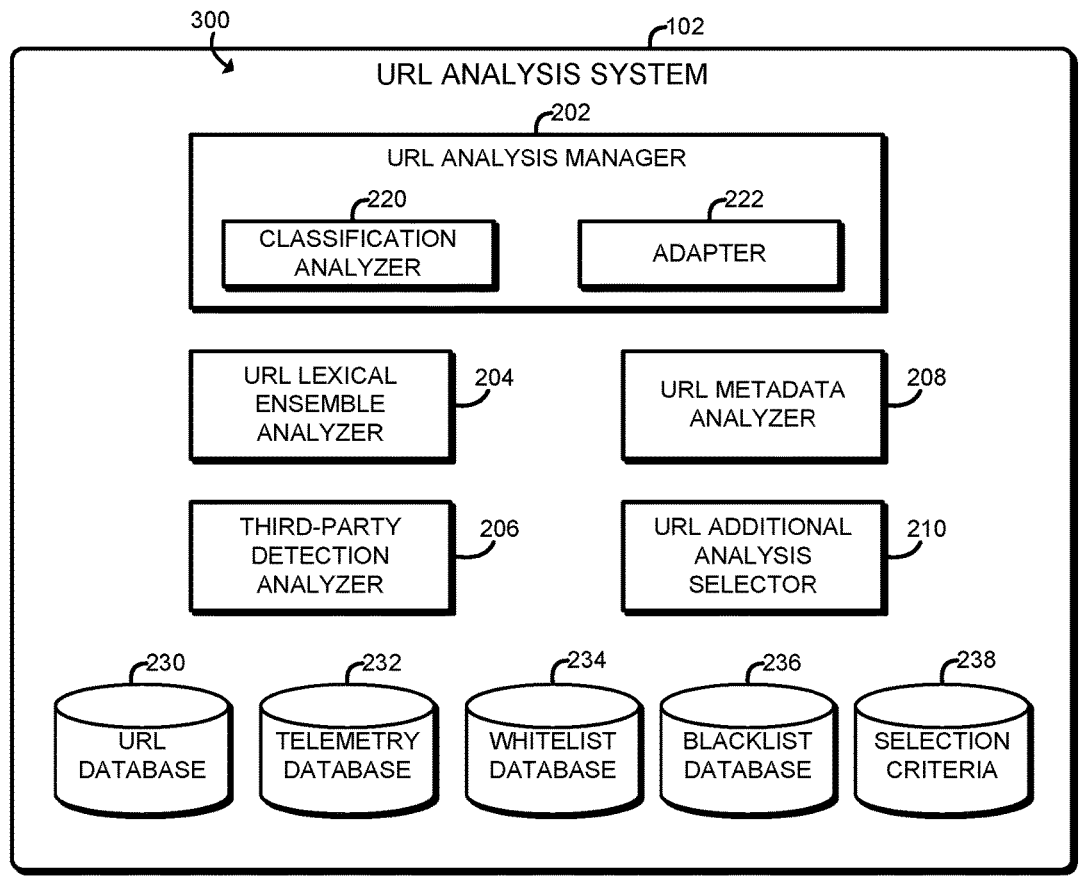
FIG. 2 is a simplified block diagram of at least one embodiment of an environment that may be established by a URL analysis system of the system of FIG. 1.

Referring now to FIG. 2, the illustrative embodiment, the URL analysis system 102 may establish an environment 200 during operation. The illustrative environment 200 includes a URL analysis manager 202, a third-party detection analyzer 206, a URL metadata analyzer 208, and a URL additional analysis selector 210. The various components of the environment 200 may be embodied as hardware, firmware, software, or a combination thereof. As such, in some embodiments, one or more of the components of the environment 200 may be embodied as circuitry or collection of electrical devices (e.g., URL analysis manager circuit 202, a third-party detection analyzer circuit 206, a URL metadata analyzer circuit 208, a URL additional analysis selector 210 circuit, etc.). It should be appreciated that, in such embodiments, one or more of the URL analysis manager circuit 202, the third-party detection analyzer circuit 206, the URL metadata analyzer circuit 208, and the URL additional analysis selector 210 circuit may form a portion of one or more of the processor 120, the I/O subsystem 122, the memory 124, the communication circuit 126, and/or other components of the URL analysis system 102 102. Additionally, in some embodiments, one or more of the illustrative components of the environment 200 may form a portion of another component and/or one or more of the illustrative components may be independent of one another. Further, in some embodiments, one or more of the components of the environment 200 may be embodied as virtualized hardware components or emulated architecture, which may be established and maintained by the processor 120 or other components of the URL analysis system 102.

The URL analysis manager 202 is configured to manage the multi-stage analysis performed by the URL analysis system 102. For example, in the illustrative embodiment, the URL analysis manager 202 manages the operation of the URL lexical ensemble analyzer 204, the third-party detection analyzer 206, and the URL metadata analyzer 208. To do so, the URL analysis manager 202 includes a classification analyzer 220 and an adapter 222. The classification analyzer 220 is configured to analyze the malicious URL classification score determined or generated by each of the URL lexical ensemble analyzer 204, the third-party detection analyzer 206, and the URL metadata analyzer 208 to determine whether the next stage of the multi-stage URL analysis is to be performed on the URL. For example, as discussed above, the classification analyzer 220 may compare the determined malicious URL classification score to a confidence threshold and proceed to the next stage of the multi-stage URL analysis if the malicious URL classification score does not satisfy the confidence threshold. In the illustrative embodiment, the confidence threshold is embodied as a value or range of values that, if matched or satisfied by the malicious URL classification score, indicates a high confidence in the malicious URL classification score. In such cases, the classification analyzer 220 utilizes the present malicious URL classification score without proceeding to the next analysis stage.

The adapter 222 of the URL analysis manager 202 is configured to train or otherwise provide feedback to each of the URL lexical ensemble analyzer 204, the third-party detection analyzer 206, and the URL metadata analyzer 208 based on the malicious URL analysis performed by each analyzer 204, 206, 208. To do so, the adapter 222 may utilize any suitable learning technique or algorithm. For example, in some embodiments, the adapter 222 may rely on active learning in which an "oracle," which may be a human trainer or an automated trainer, actively labels data (e.g., URLs) to provide accurate-labeled data sets as feedback to the analyzers 204, 206, 208. The labeled data may be used to train or retrain a classifier used by the analyzers 204, 206, 208 to improve the accuracy of the classification and/or overall performance. Additionally or alternatively, the adapter 222 may utilize online learning to account for concept drift. Concept drift can occur when properties of the target data (e.g., URLs) changes over time. As such, concept drift is a non-stationary learning problem that varies over time. To account for concept drift, the URL analysis manager 202 may retrain the classifiers used by the analyzers 204, 206, 208 in some embodiments. Unlike traditional batch learning, the online learning techniques (also referred to as "incremental learning") employed by the adapter 222 update the classification model used by the analyzers 204, 206, 208 using singular or small-set samples (e.g., a single URL), which may improve the speed and scalability of the retraining process. Again, such machine learning may be based on the particular URL, the determined malicious URL classification score itself, and/or other data or information related to the determination of the malicious URL classification score.

The URL lexical ensemble analyzer 204 is configured to analyze the URL using an ensemble of lexical analyzers. For example, in the illustrative embodiment, the URL lexical ensemble analyzer 204 analyzes the URL using a natural language processing algorithm and at least one representation learning algorithm. The URL lexical ensemble analyzer 204 aggregates the outputs of each of the lexical analyzers to determine the first-stage malicious URL classification score. The URL lexical ensemble analyzer 204 may utilize any suitable URL-related data as input to each of the lexical analyzers. For example, in the illustrative embodiment, the URL lexical ensemble analyzer 204 utilizes a URL database 230, a telemetry database 232, a whitelist database 234, and/or a blacklist database 236. The URL database 230 may store URLs under investigation and/or metadata associated with such URLs. The telemetry database 232 stores telemetry data related to each of the URL. The telemetry data may be embodied as any type of URL telemetry data such the URL itself, an internet protocol (IP address associated with the URL, a previously determined reputation score, a defined category code of the URL (e.g., education, sport, food, etc.), and/or other data related to the URL. The whitelist database 234 includes a list of URLs known to be non-malicious. In some embodiments, the whitelist of the whitelist database 234 may be maintained as a hash of known-good URLs. Similar to the whitelist database 234, the blacklist database 236 includes a list of URLs known to be malicious, which may be maintained as a hash of known-bad URLs.

Figure 3:
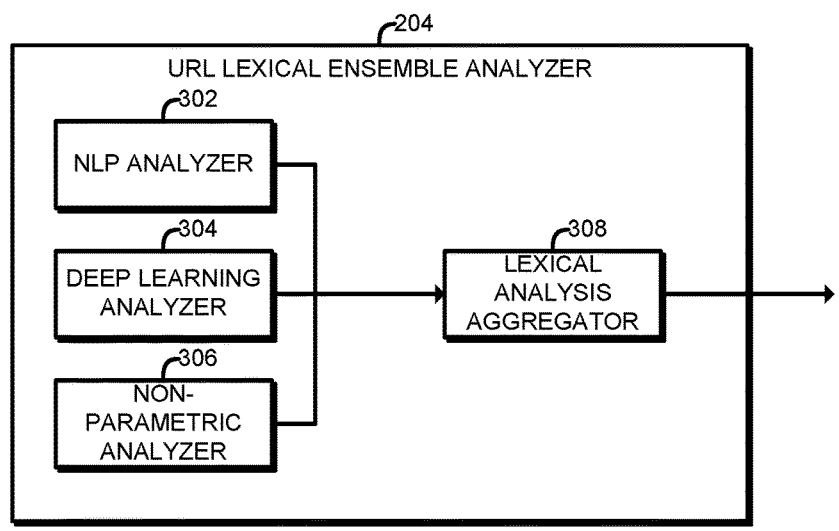
FIG. 3 is a simplified block diagram of at least one embodiment of a URL lexical ensemble analyzer of the URL analysis system of FIGS. 1 and 2.

As discussed above, the illustrative URL lexical ensemble analyzer 204 utilizes multiple lexical analyzers to determine a first-stage malicious URL classification score of the URL. An illustrative embodiment of the URL lexical ensemble analyzer 204 is shown in FIG. 3. Illustratively, the URL lexical ensemble analyzer 204 includes a natural language processing analyzer 302 and two representation learning analyzers, a deep learning analyzer 304 and a non-parametric analyzer 306. Each of the natural language processing analyzer 302, the deep learning analyzer 304, and the non-parametric analyzer 306 are configured to separately analyze the URL using corresponding lexical analysis algorithms and generate a malicious URL classification score. To do so, the natural language processing analyzer 302 may utilize any one or more suitable natural language processing algorithms or techniques to perform a lexical analysis on the URL including, but not limited to random forests, hidden markov model, and/or other natural language processing algorithms. Similarly, the deep learning analyzer 304 may utilize any one or more suitable deep learning algorithm or techniques to perform a lexical analysis on the URL including, but not limited to recurrent neural networks, convolutional neural networks, and/or other deep learning algorithms. Additionally, the non-parametric analyzer 306 may utilize any one or more suitable non-parametric algorithm or techniques to perform a lexical analysis on the URL including, but not limited to Gaussian processes, Dirichlet processes, and/or other non-parametric algorithms.

The illustrative URL lexical ensemble analyzer 204 also includes a lexical analysis aggregator 308, which is configured to aggregate the malicious URL classification scores produced or generated by each of the natural language processing analyzer 302, the deep learning analyzer 304, and the non-parametric analyzer 306 to determine the first-stage malicious URL classification score. To do so, the lexical analysis aggregator 308 may utilize any methodology to aggregate the malicious URL classification scores. For example, in the illustrative embodiment, the lexical analysis aggregator 308 utilizes a Bayesian Committee Machine to estimate weights to be applied to each of the malicious URL classification scores generated by the various analyzers 302, 304, 306. The estimated weights may be used to determine a weighted sum of the malicious URL classification scores. Alternatively, a simple majority vote selection algorithm may be employed by the lexical analysis aggregator 308.

It should be appreciated that each of the lexical analyzers of the URL lexical ensemble analyzer 204 may be independent of each other. As such, in some embodiments, only one or some of the lexical analyzers of the URL lexical ensemble analyzer 204 may be used. For example, in some embodiments, the analyzer 204 may utilize a single lexical ensemble analyzer 204. In other embodiments, the outputs of the multiple lexical analyzers of the URL lexical ensemble analyzer 204 may be ensemble by the lexical analysis aggregator 308 only if the outputs are complementary to each other (e.g., outlying malicious URL classification scores may be ignored or otherwise not used).

Referring back to FIG. 2, the third-party detection analyzer 206 is configured to analyze the URL based on third-party malicious URL detection results to determine the second-stage malicious URL classification score. To do so, the third-party detection analyzer 206 may periodically or responsively access the one or more third-party URL analysis systems 104 to retrieve the third-party malicious URL detection results associated with the particular URL under analysis. As discussed above, the third-party malicious URL detection results may be embodied as an aggregation of third-party malicious URL detection analysis and associated results. The third-party malicious URL detection results may be embodied as any type of data or information related to, or otherwise relevant to, the URL and from which the maliciousness of the URL may be determined or inferred. For example, in some embodiments, the third-party malicious URL detection results may be embodied as malicious URL classification scores similar to the scores produced in the various stages of the multi-stage URL analysis performed by the URL analysis system 102.

The URL metadata analyzer 208 is configured to analyze the URL based on URL metadata related to or otherwise associated with the URL under analysis. To do so, the URL metadata analyzer 208 may utilize any suitable algorithm and/or mechanism to identity, gather, and analyze URL metadata related to the URL. The URL metadata analyzed by the URL metadata analyzer 208 may be embodied as any type of metadata related to or associated with the URL. For example, in some embodiments, the URL metadata may include an identity of the Internet Protocol (IP) address corresponding to the URL, an identity of a company associated with the URL, an indication of the popularity of the URL, and/or other data related to the URL and from which the maliciousness of the URL may be determined or inferred. Regardless, the URL metadata analyzer 208 determines a third-stage malicious URL classification score based on the URL metadata analysis.

The URL additional analysis selector 210 is configured to select a subset of URL for additional analysis, such as content analysis. To do so, the URL additional analysis selector 210 utilizes selection criteria 238 to analyze each URL for the additional analysis. The selection criteria 238 may be embodied as any type of data or information related to the URL that is not also used in the determination of the first, second, or third malicious URL classification score. That is, the selection criteria 238 include data not used by any of the URL lexical ensemble analyzer 204, the third-party detection analyzer 206, and/or the URL metadata analyzer 208 in the analysis of the URL. In the illustrative embodiment, the selection criteria 238 includes customer feedback related to a classification of the URL, URL owner feedback related to a classification of the URL, analysis of the URL using an expanded whitelist or an expanded blacklist (i.e., a whitelist and/or blacklist different from the whitelist 234 and blacklist 236), a determined level of risk to a customer for false classification of the URL, a variance between the first, second, or third malicious classification score of the URL and a third-party malicious classification score for the URL, and a determined age of the URL.

Figure 4:
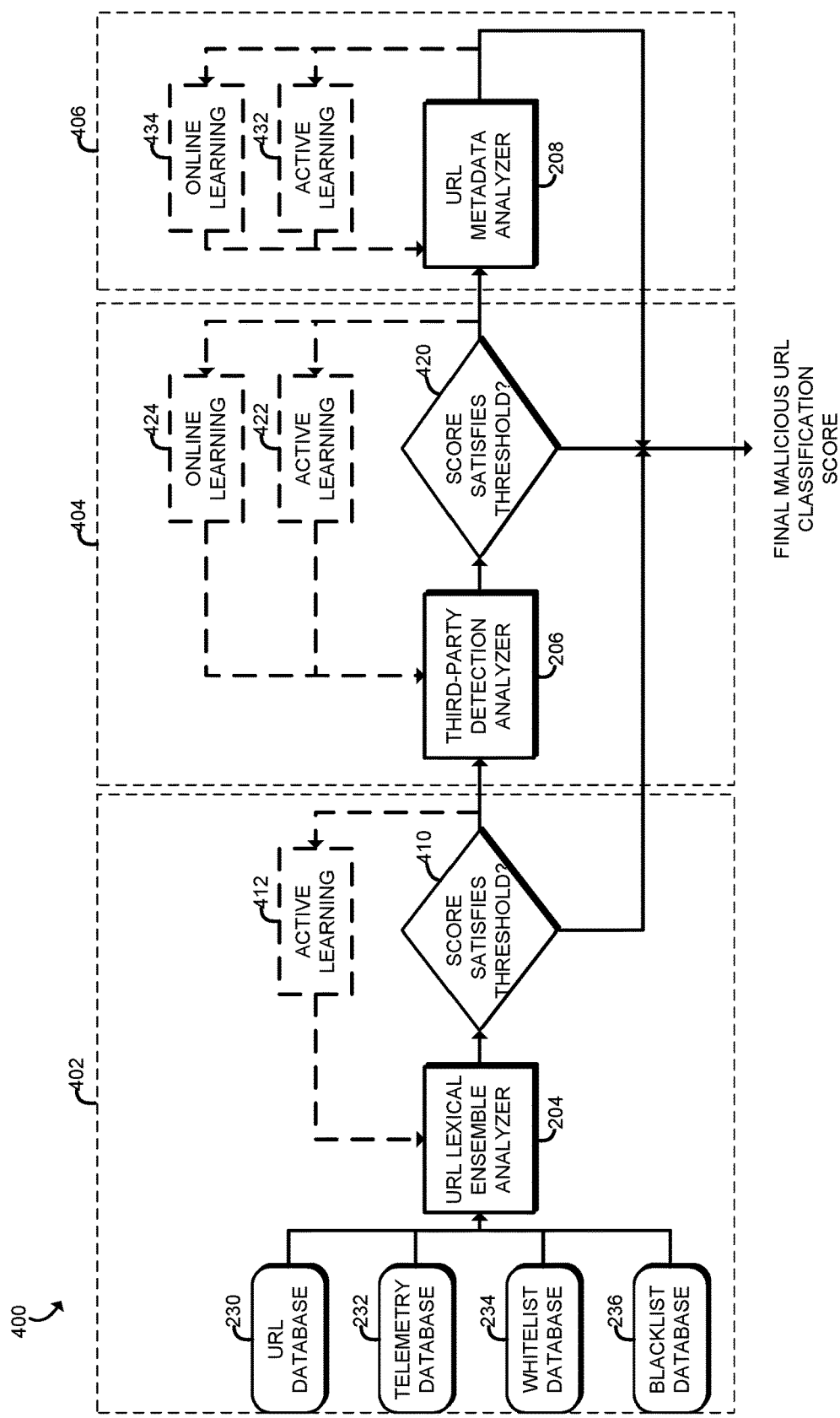
FIG. 4 is a simplified workflow diagram of a multi-stage URL analysis performed by the URL analysis system of FIGS. 1-3.

Referring now to FIG. 4, a URL analysis workflow 400 of the multi-stage URL analysis performed by the URL analysis system 102 is shown. As discussed above, the URL analysis workflow 400 includes a first analysis stage 402, a second analysis stage 404, and a third analysis stage 406. In the first analysis stage 402 and as discussed above, the URL lexical ensemble analyzer 204 analyzes the URL using multiple lexical analyzers and the URL database 230, the telemetry database 232, the whitelist database 234, and the blacklist database 236. Again, although multiple lexical analyzers are used in the illustrative embodiment, a single lexical analyzer may be used in other embodiments. Regardless, the URL lexical ensemble analyzer 204 generates a first-stage malicious URL classification score based on the multiple lexical analysis. The URL analysis manager 202 analyzes the first-stage malicious URL classification score at workflow block 410 to determine whether the first-stage malicious URL classification score satisfies the confidence threshold. As discussed above the confidence threshold may be embodied as threshold values or ranges of values that, if a malicious URL classification score satisfies, provides a high confidence that the URL is either malicious or not malicious. The particular threshold value or ranges of values may be based on the particular lexical analyzers used by the URL lexical ensemble analyzer 204 and/or other criteria.

If the URL analysis manager 202 determines that the first-stage malicious URL classification score does satisfy the confidence threshold, the first-stage malicious URL classification score is used as the final malicious URL classification score. If, however, the URL analysis manager 202 determines that the first-stage malicious URL classification score does not satisfy the confidence threshold, the URL analysis manager 202 provides the URL to the second analysis stage 404. Additionally, in some embodiments, the URL analysis manager 202 may train or retrain the URL lexical ensemble analyzer based on the results of the lexical analysis. To do so, the URL analysis manager 202 rely on an active learning procedure 412 in which an "oracle" supplies labeled data to the URL lexical ensemble analyzer 204 for retraining purposes.

In the second analysis stage 404 and as discussed above, the third-party detection analyzer 206 analyzes the URL based on third-party malicious URL detection results. The third-party detection analyzer 206 generates a second-stage malicious URL classification score based on the third-party malicious URL detection results related to the URL. As discussed above, the third-party malicious URL detection results may be embodied as any type of data or information related to, or otherwise relevant to, the URL and from which the maliciousness of the URL may be determined or inferred.

The URL analysis manager 202 analyzes the second-stage malicious URL classification score at workflow block 420 to determine whether the second-stage malicious URL classification score satisfies the confidence threshold. If the URL analysis manager 202 determines that the second-stage malicious URL classification score does satisfy the confidence threshold, the second-stage malicious URL classification score is used as the final malicious URL classification score. If, however, the URL analysis manager 202 determines that the second-stage malicious URL classification score does not satisfy the confidence threshold, the URL analysis manager 202 provides the URL to the third analysis stage 406. Additionally, in some embodiments, the URL analysis manager 202 may train or retrain the third-party detection analyzer 206 based on the results of the third-party metadata analysis. To do so, the URL analysis manager 202 may rely on an active learning procedure 422 in which an "oracle" supplies labeled data to the third-party detection analyzer 206 for retraining purposes and/or an online learning procedure 424 in which a singular or small-set samples (e.g., a single URL) are used to update the model used by the third-party detection analyzer 206 to account for any concept drift. As discussed above, such machine learning may be based on the particular URL, the determined second-stage malicious URL classification score itself, and/or other data or information related to the determination of the second-stage malicious URL classification score.

In the third analysis stage 406 and as discussed above, the URL metadata analyzer 208 analyzes the URL based on URL metadata related to or otherwise associated with the URL under analysis. The URL metadata analyzer 208 generates a third-stage malicious URL classification score based on the URL metadata analysis. As discussed above, the URL metadata analyzed by the URL metadata analyzer 208 may be embodied as any type of data related to the URL and from which the maliciousness of the URL may be determined or inferred.

The third-stage malicious URL classification score produced by the URL metadata analyzer 208 is utilizes as the final malicious URL classification score, unless the URL analysis workflow 400 includes further analysis stages. Additionally, in some embodiments, the URL analysis manager 202 may train or retrain the URL metadata analyzer 208 based on the results of the local URL metadata analysis. To do so, the URL analysis manager 202 rely on an active learning procedure 432 in which an "oracle" supplies labeled data to the URL metadata analyzer 208 for retraining purposes and/or an online learning procedure 424 in which a singular or small-set samples (e.g., a single URL) are used to update the model used by the URL metadata analyzer 208 to account for any concept drift. As discussed above, such machine learning may be based on the particular URL, the determined third-stage malicious URL classification score itself, and/or other data or information related to the determination of the third-stage malicious URL classification score.

Figure 5:
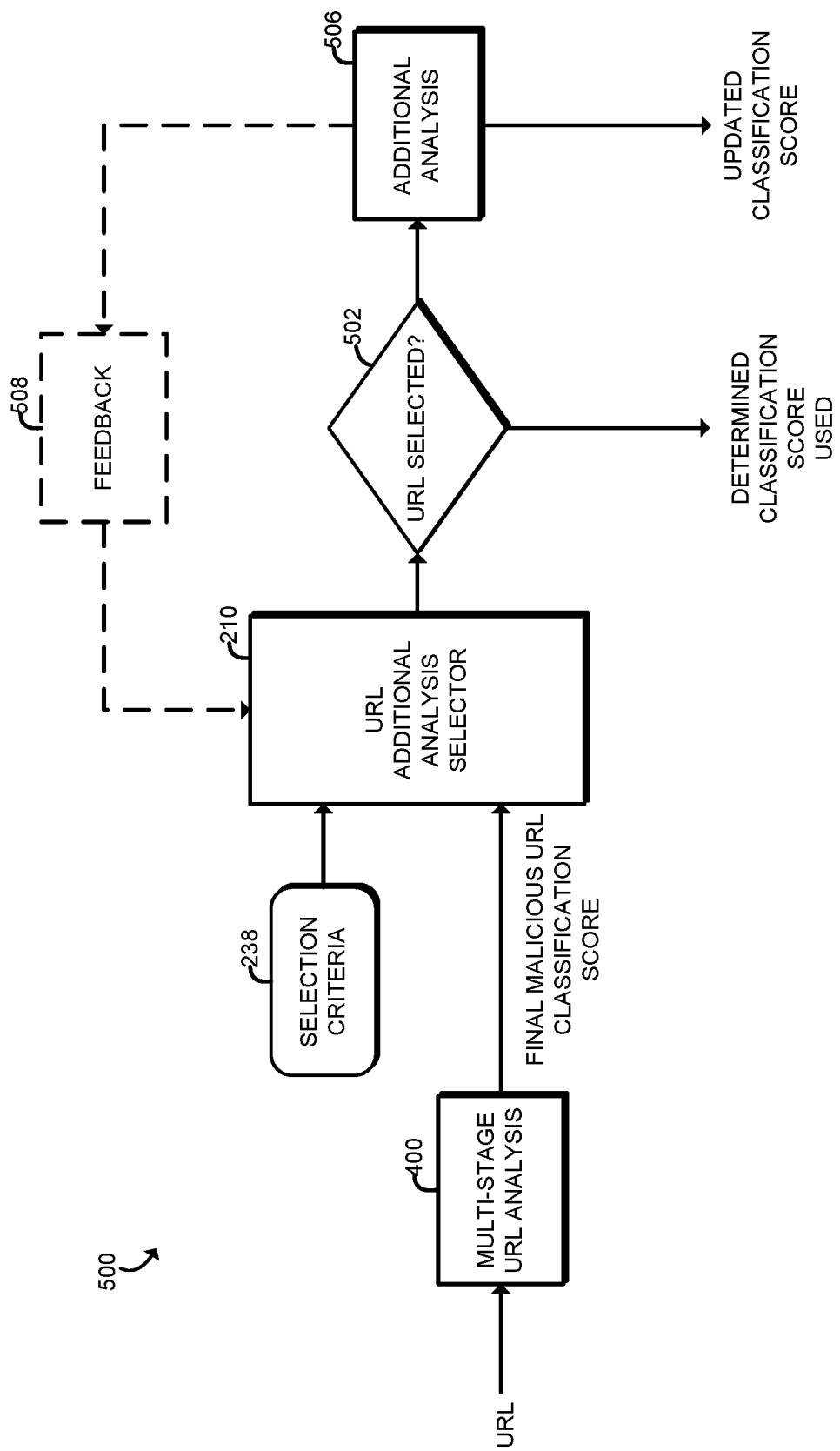
FIG. 5 is a simplified workflow diagram of a URL selection analysis performed by the URL analysis system of FIGS. 1-3.

Referring now to FIG. 5, in some embodiments and as discussed above, the URL analysis system 102 may perform a URL selection workflow 500 in which the URL analysis system 102 selects URLs for additional, more rigorous analysis. In the URL selection workflow 500, the URL additional analysis selector 210 receives the final malicious URL classification score from the URL analysis workflow 400 described above and selects URLs for additional analysis based on the selection criteria 238. As discussed above, the selection criteria 238 may be embodied as any type of data or information related to the URL that is not also used in the URL analysis workflow 400 to determine the final malicious URL classification score. As such, it should be appreciated that the malicious URL analysis performed in the URL analysis workflow 400 is separate from the URL selection process performed in the URL selection workflow 500.

Illustratively, the selection criteria 238 includes customer feedback related to a classification of the URL, URL owner feedback related to a classification of the URL, analysis of the URL using an expanded whitelist or an expanded blacklist (i.e., a whitelist and/or blacklist different from the whitelist 234 and blacklist 236), a determined level of risk to a customer for false classification of the URL, a variance between the first, second, or third malicious classification score of the URL and a third-party malicious classification score for the URL, and a determined age of the URL.

The customer feedback may be embodied as any type of data or information provided by customers or user of the URL analysis system 102 regarding the classification of one or more URLs. In regard to the machine learning algorithms employed by the URL analysis system 102, such customer feedback may be positive reinforcing (e.g., an indication that a URL is malicious) or negative reinforcing (e.g., an indicating that a URL is non-malicious). The customer feedback may be used to filter out false positive and/or false negative maliciousness classifications of the URL.

Similar to the customer feedback, the URL owner feedback may be embodied as any type of data or information provided by an owner of the URL regarding the classification of the owned URL. Again, in regard to the machine learning algorithms employed by the URL analysis system 102, such URL owner feedback may be positive reinforcing (e.g., an indication that a URL is malicious) or negative reinforcing (e.g., an indicating that a URL is non-malicious). As with the customer feedback, the URL owner feedback may be used to filter out false positive and/or false negative maliciousness classifications of the URL.

The expanded whitelist and/or expanded blacklist may be similar to whitelist database 234 and blacklist database 236, but include additional URLs. The additional URLs may have a lower confidence score regarding their respective classification than those URLs included in the whitelist database 234 and blacklist database 236. However, because the expanded whitelist and/or expanded blacklist are used only for selection purposes, URLs having lower confidence scores may be used.

The level of risk to a customer may be embodied as any value or data indicative of a level of risk to the customer for a false classification of the URL (e.g., either a false negative or a false positive). For example, some URLs are heavily used by most customers and provide basic web resources (e.g., a search engine). If such a URL is falsely determined to be malicious and blocked, the customer may experience a significant negative impact or experience due to not being able to access that particular web resource.

The variance between the URL malicious classification score and the third-party malicious classification score may be embodied as any type of value or data indicative of the difference between the final malicious URL classification score produced by the URL analysis workflow 400 and a URL malicious classification score produced or maintained by one or more third-party URL analysis systems 104. In some embodiments, the URL additional analysis selector 210 may average the URL malicious classification scores obtained from the third-party URL analysis systems 104 and determine a variance or difference between such average URL malicious classification score and the final malicious URL classification score produced by the URL analysis workflow 400.

The age of the URL may be embodied as any type of data or other information indicative of how long the URL has been active. As discussed above, many malicious URLs may be transient in nature and quickly go live and go dead, unlike popular, well-known and utilized URLs.

The URL analysis manager 202 determines whether the URL additional analysis selector 210 has selected the present URL for additional analysis in workflow block 502. If not, the final malicious URL classification score determined by the multi-stage URL analysis flow 400 is used. If, however, URL analysis manager 202 determines that the present URL has been selected for additional analysis, the URL is further analyzed in workflow block 506. To do so, any type of additional, more rigorous analysis may be applied to the URL in workflow block 506. For example, in some embodiments, human analysis is applied in block 506. It should be appreciated that the additional analysis conducted in workflow block 506 may be computational-, time-, and/or labor-intensive. As such, only those URLs meeting the selection parameters are selected for the additional rigorous analysis. Additionally, in some embodiments, the URL analysis manager 202 may provide feedback to the URL additional analysis selector 210 in workflow block 508 to train or retrain the URL additional analysis selector 210. Such feedback may employ, for example, an active learning procedure in which an "oracle" supplies labeled data to the URL additional analysis selector 210 for retraining purposes and/or an online active learning procedure in which a singular or small-set samples (e.g., a single URL) are provided to the URL additional analysis selector 210 to account for any concept drift.

Figure 6:
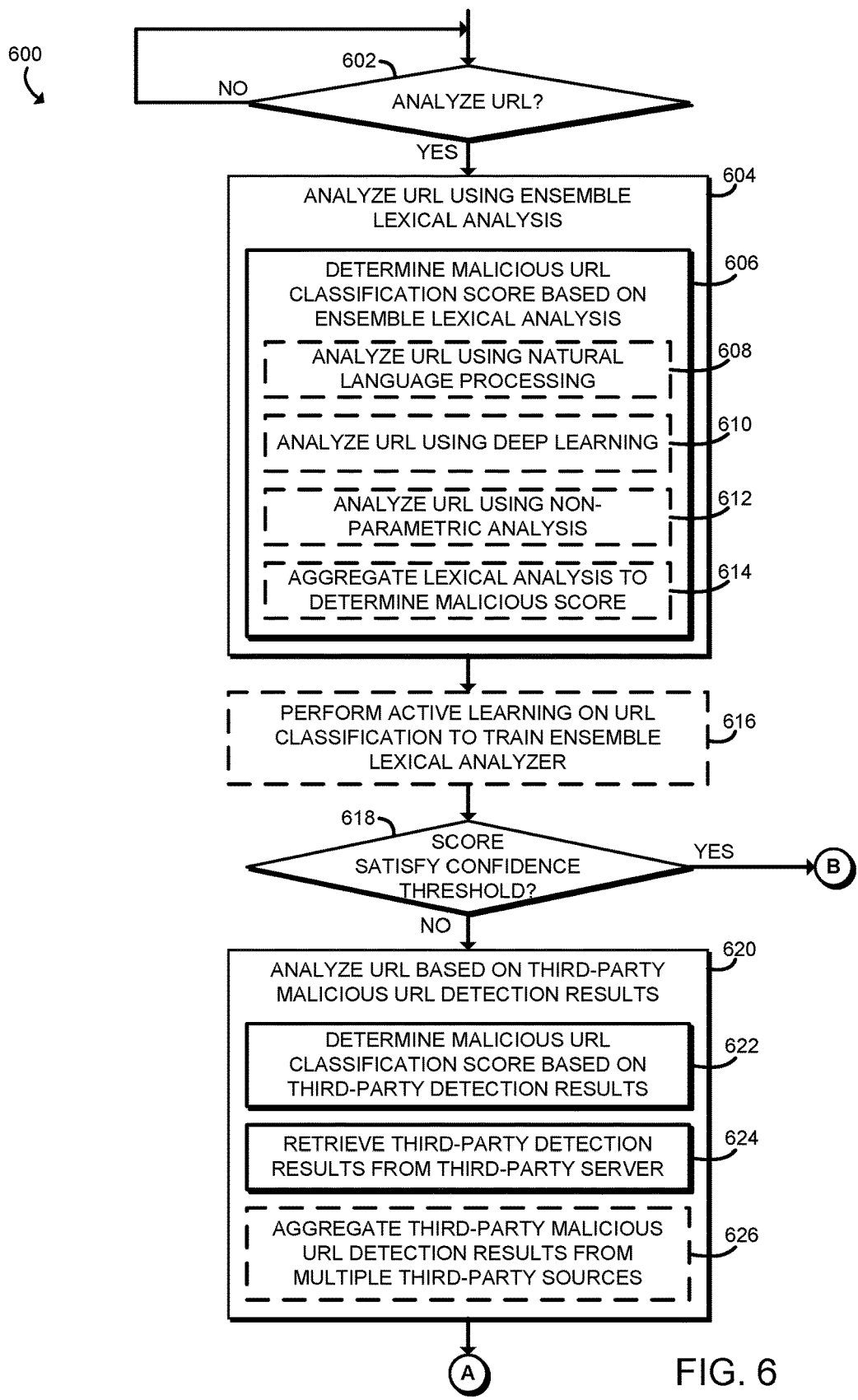
FIGS. 6-8 are a simplified flow diagram of at least one embodiment of a method for analyzing a URL that may be executed by the URL analysis system of FIGS. 1-3.
Figure 7:
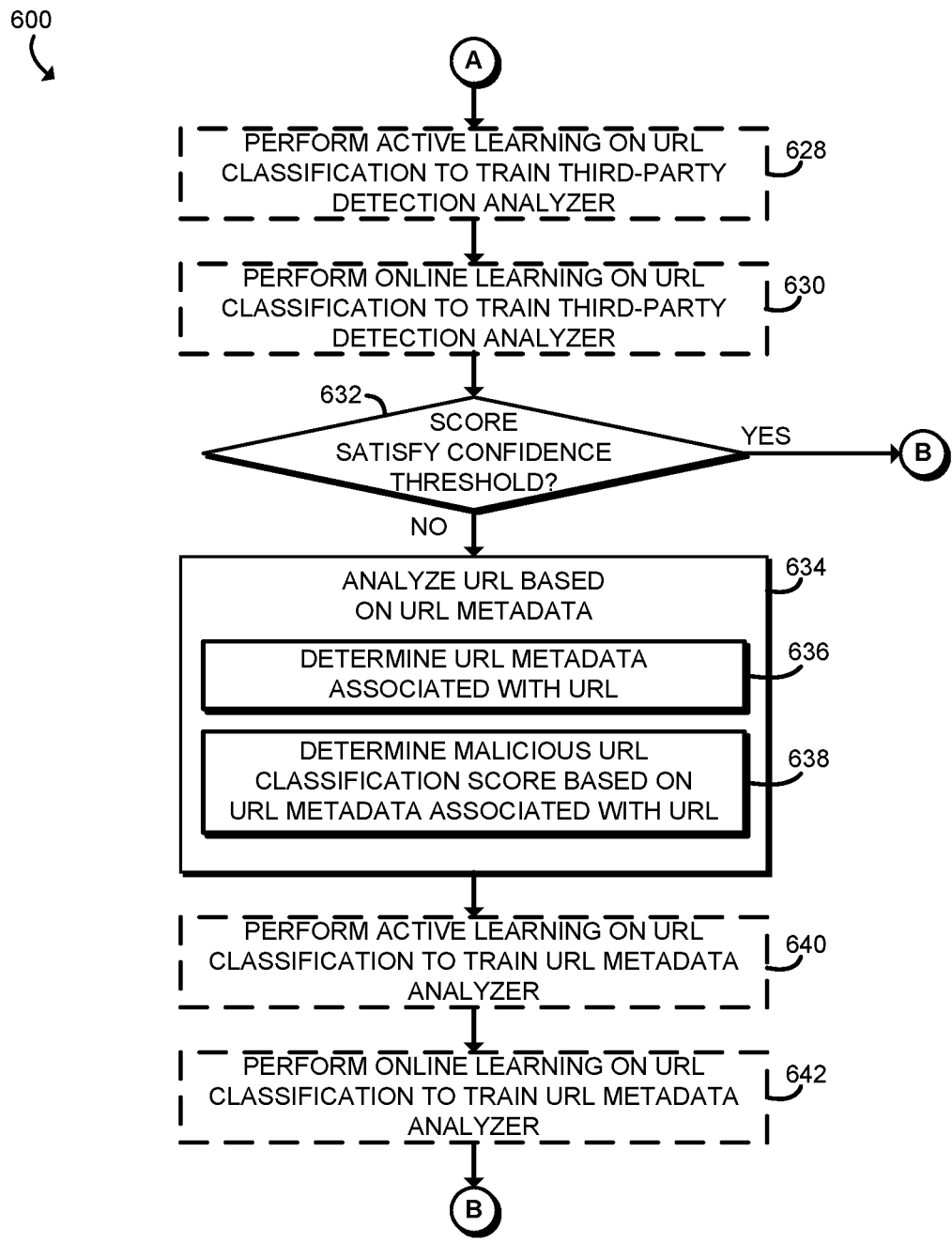
Figure 8:
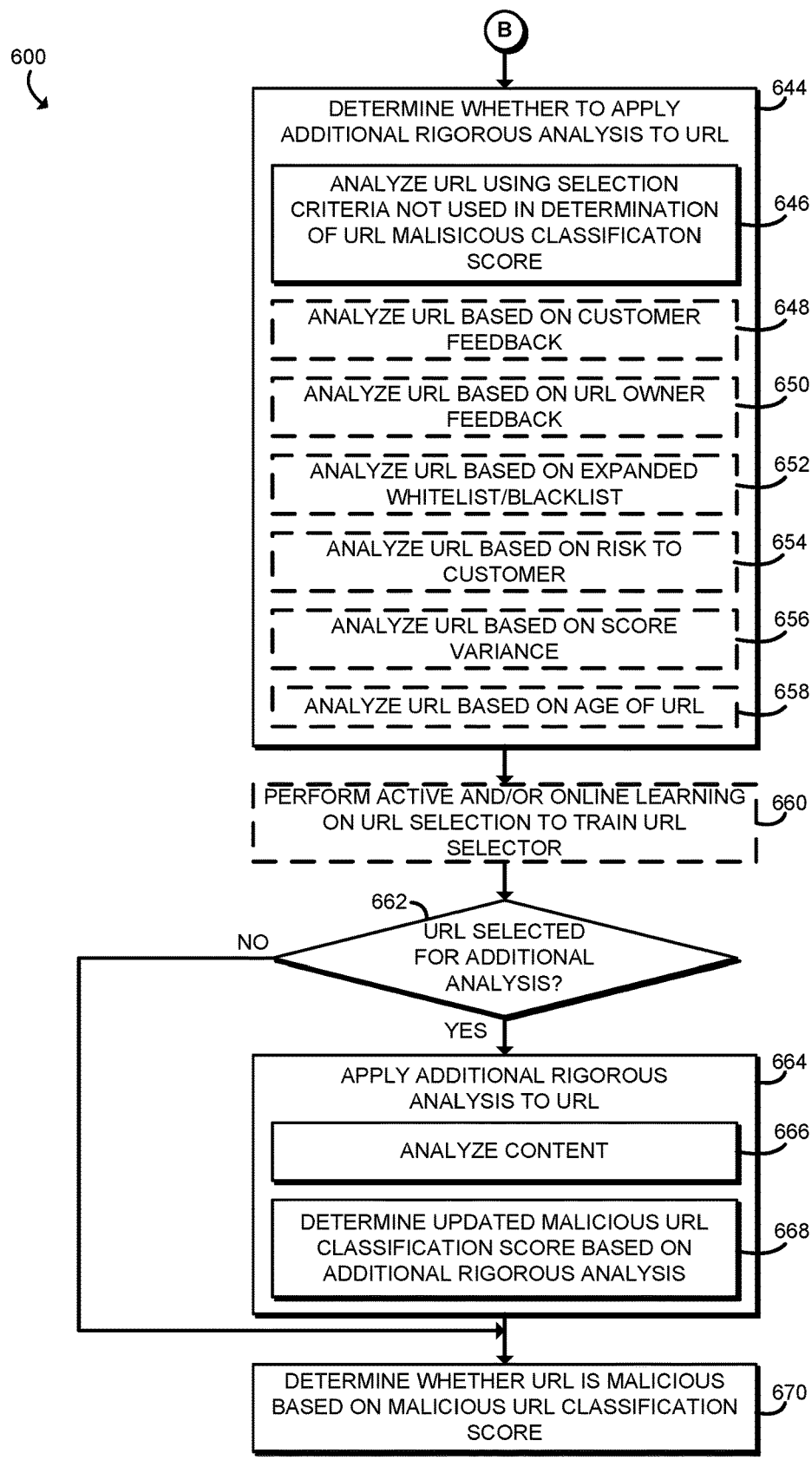

Referring now to FIGS. 6-8, in use, the URL analysis system 102 may execute a method 600 for analyzing a URL. The method 600 begins with block 602 in which the URL analysis system 102 determines whether to analyze a URL. To do so, the URL analysis system 102 may sequentially analyze URLs stored in the URL database 230 and/or analyze a URL supplied by a client compute device 106 or client server 108 via an application program interface or the like. If the URL analysis system 102 determines to analyze the URL, the method 600 advances to block 604 in which the URL analysis system 102 performs an ensemble lexical analysis on the URL. In doing so, in block 606, the URL analysis system 102 determines a first-stage URL malicious URL classification score for the URL. As discussed above, the URL analysis system 102 may utilize any number and type of lexical analysis algorithms and/or methodologies to perform the lexical analysis. For example, in the illustrative embodiment, the URL analysis system 102 analyzes the URL using a natural language processing algorithm in block 608. Additionally, in block 510, the URL analysis system 102 analyzes the URL using a deep learning algorithm. Further, in block 612, the URL analysis system 102 analyzes the URL using a non-parametric analysis algorithm. In block 614, the URL analysis system 102 aggregates the lexical analysis performed in each of blocks 608, 610, 612. To do so, in the illustrative embodiment and as discussed above, the URL analysis system 102 may apply a Bayesian Committee Machine to combine the malicious URL classification scores produced in each of the blocks 608, 610, 612 to determine the first-stage malicious URL classification score using, for example, weighted sum or simple majority. Again, as discussed above, only one or sum of the lexical analyzers may be used in block 604 in some embodiments. As such, in some embodiments, the analysis performed in block 604 may not be embodied as an ensemble analysis.

After the URL analysis system 102 has performed the ensemble lexical analysis on the URL in bock 604, the method 600 advances to block 616 in some embodiments. In such embodiments, the URL analysis system 102 performs an active learning procedure on the ensemble lexical analysis performed in block 604 to provide additional training or retraining of the lexical analysis procedure. As discussed above, the active learning procedure may rely on an "oracle" to supply labeled data to the URL lexical ensemble analyzer 204 for retraining purposes. In some embodiments, the URL analysis system 102 performs the active learning procedure in response to a determination that the first-stage malicious URL classification score is ambiguous (e.g., falls within a reference score range indicating uncertainty).

In block 618, the URL analysis system 102 determines whether the first-stage malicious URL classification score generated in block 604 satisfies the confidence threshold. As discussed above, the confidence threshold may be embodied as a value or range of values that, if matched or satisfied by a malicious URL classification score, indicates a high confidence in the malicious URL classification score. If the URL analysis system 102 determines that the first-stage malicious URL classification score does satisfy the confidence threshold, the method 600 advances to block 644 of FIG. 8 discussed below. If, however, the URL analysis system 102 determines that the first-stage malicious URL classification score does not satisfy the confidence threshold in block 8 the method 600 advances to block 620.

In block 620, the URL analysis system 102 analyzes the URL based on third-party malicious URL detection results. In doing so, in block 622, the URL analysis system 102 determines a second-stage malicious URL classification score for the URL based on the third-party detection results. To do so, the URL analysis system 102 may periodically or responsively access the one or more third-party URL analysis systems 104 to retrieve the third-party malicious URL detection results associated with the particular URL under analysis in block 624. In some embodiments, in block 626, the URL analysis system 102 may aggregate the third-party malicious URL detection results from multiple third-party URL analysis systems 104 and utilize the aggregated third-party URL detection results to perform the analysis of block 620. As discussed above, the third-party malicious URL detection results may be embodied as any type of data or information related to, or otherwise relevant to, the URL and from which the maliciousness of the URL may be determined or inferred. For example, in some embodiments, the third-party malicious URL detection results may be embodied as malicious URL classification scores.

After the URL analysis system 102 has analyzed the URL based on the third-party malicious URL detection results, the method 600 advances to block 628 of FIG. 7 in some embodiments. In such embodiments, the URL analysis system 102 performs an active learning procedure on the third-party malicious URL detection results analysis performed in block 620 to provide additional training or retraining of the third-party detection results analysis procedure. As discussed above, the active learning procedure may rely on an "oracle" to supply labeled data to the third-party detection analyzer 206 for retraining purposes. Additionally, in some embodiments in block 630, the URL analysis system 102 may perform an online learning procedure on the third-party detection results analysis performed in block 620 to provide additional training or retraining of the third-party malicious URL detection results analysis procedure. As discussed above, the online learning procedure may include updating the model used by the third-party detection analyzer 206 using singular or small-set samples (e.g., a single URL) to account for any concept drift. In some embodiments, the URL analysis system 102 performs the active learning and/or online procedures in response to a determination that the second-stage malicious URL classification score is ambiguous (e.g., falls within a reference score range indicating uncertainty).

In block 632, the URL analysis system 102 determines whether the second-stage malicious URL classification score generated in block 620 satisfies the confidence threshold. If the URL analysis system 102 determines that the second-stage malicious URL classification score does satisfy the confidence threshold, the method 600 advances to block 644 of FIG. 8 discussed below. If, however, the URL analysis system 102 determines that the second-stage malicious URL classification score does not satisfy the confidence threshold in block 632, the method 600 advances to block 634.

In block 634, the URL analysis system 102 analyzes the URL based on URL metadata related to or otherwise associated with the URL under analysis. To do so, in block 636, the URL analysis system 102 may determine the particular URL metadata to be analyzed. The URL metadata may be predefined in some embodiments. However, in other embodiments, the URL metadata to be analyzed may be determined based on the URL itself, data related to the URL, and/or other criteria. For example, in some embodiments, the URL metadata may include an identity of the Internet Protocol (IP) address corresponding to the URL, an identity of a company associated with the URL, an indication of the popularity of the URL, and/or other data related to the URL and from which the maliciousness of the URL may be determined or inferred. In block 638, the URL analysis system 102 determines a third-stage malicious URL classification score for the URL. As discussed above, the URL metadata may be embodied as any type of metadata or information related to or associated with the URL.

After the URL analysis system 102 has performed the analyzed the URL based on the URL metadata, the method 600 advances to block 640 in some embodiments. In such embodiments, the URL analysis system 102 performs an active learning procedure on the URL metadata analysis performed in block 634 to provide additional training or retraining of the URL metadata analysis procedure. As discussed above, the active learning procedure may rely on an "oracle" to supply labeled data to the URL metadata analyzer 208 for retraining purposes. Additionally, in some embodiments in block 642, the URL analysis system 102 may perform an online learning procedure on the URL metadata analysis performed in block 634 to provide additional training or retraining of the URL metadata analysis procedure. As discussed above, the online learning procedure may include updating the model used by the URL metadata analyzer 208 using a singular or small-set samples (e.g., a single URL) to account for any concept drift. In some embodiments, the URL analysis system 102 performs the active learning and/or online procedures in response to a determination that the third-stage malicious URL classification score is ambiguous (e.g., falls within a reference score range indicating uncertainty).

Referring now to block 644 of FIG. 8, the illustrative URL analysis system 102 is also configured to determine whether to apply additional rigorous analysis, such as content analysis, to the URL under analysis. To do so, the URL analysis system 102 analyzes the URL using the selection criteria 238 to select URLs for the additional analysis. As discussed above, the selection criteria 238 may be embodied as any type of data or information related to the URL that is not also used in the determination of the first, second, or third malicious URL classification score determined in blocks 604, 620, and 634, respectively. In the illustrative embodiment, for example, the URL analysis system 102 analyzes the URL based on customer feedback related to a classification of the URL in block 648. Additionally, the URL analysis system 102 may analyze the URL based on URL owner feedback related to a classification of the URL in block 650. Further the URL analysis system 102 may analyze the URL based on analysis of the URL using an expanded whitelist or an expanded blacklist in block 652. Additionally, the URL analysis system 102 may analyze the URL based on a determined level of risk to a customer for false classification of the URL in block 654. The URL analysis system 102 may also analyze the URL based on a variance between the first, second, or third malicious classification score of the URL and a third-party malicious classification score for the URL in block 656. Additionally, in block 658, the URL analysis system 102 may analyze the URL based on a determined age of the URL.

After the URL analysis system 102 has determined whether to select the URL for additional analysis in block 644, the method 600 advances to block 660 in some embodiments. In such embodiments, the URL analysis system 102 performs an active learning and/or online learning procedure on the URL selection analysis performed in block 644 to provide additional training or retraining of the URL selection analysis procedure. As discussed above, the active learning procedure may rely on an "oracle" to supply labeled data to the URL additional analysis selector 210 for retraining purposes, and online learning procedure may include updating the model used by the URL additional analysis selector 210 using a singular or small-set samples (e.g., a single URL) to account for any concept drift. In some embodiments, the URL analysis system 102 may perform the active learning and/or online procedures in response to a determination that the selection analysis produced ambiguous results (e.g., an uncertainty whether to select a particular URL for further analysis).

In block 662, the URL analysis system 102 determines whether to select the particular URL for the additional, more rigorous analysis. If so, the method 600 advances to block 664 in which additional rigorous analysis is applied to the URL. For example, in some embodiments in block 666, the content of the web resource identified by the URL may be analyzed. Such analysis may include active analysis and involve, in some embodiments, the use of humans actively analyzing the content. Additionally, in some embodiments in block 668, an updated malicious URL classification score for the URL is determined based on the additional rigorous analysis performed in block 664. It should be appreciated that the additional rigorous analysis may be computationally intensive and/or time intensive.

After the additional rigorous analysis has been completed in block 664 or if URL was not selected for the additional analysis, the method 600 advances to block 670. In block 670, the URL analysis system 102 determines whether the URL is malicious based the final malicious URL classification score (e.g., the first-stage URL malicious URL classification score determined in block 604, the second-stage URL malicious URL classification score determined in block 620, or the third-stage URL malicious URL classification score determined in block 634) or the updated malicious URL classification score determined in block 664.

EXAMPLES

Illustrative examples of the technologies disclosed herein are provided below. An embodiment of the technologies may include any one or more, and any combination of, the examples described below.

Example 1 includes a Uniform Resource Locator (URL) analysis system to analyze a URL, the URL analysis system comprising a URL lexical ensemble analyzer to (i) analyze the URL based on an ensemble lexical analysis to determine a first malicious classification score for the URL, wherein the first malicious classification score is indicative of whether the URL is malicious and (ii) determining whether the first malicious classification score satisfies a confidence threshold; a third-party detection analyzer to (i) analyze the URL based on third-party malicious URL detection results associated with the URL and determined by a third-party source to determine a second malicious classification score for the URL in response to a determination that the first malicious classification score does not satisfy the confidence threshold, wherein the second malicious classification score is indicative of whether the URL is malicious and (ii) determine whether the second malicious classification score satisfies the confidence threshold; and a local URL metadata analyzer to analyze metadata related to the URL to determine a third malicious classification score for the URL in response to a determination that the second malicious classification score does not satisfy the confidence threshold, wherein the third malicious classification score is indicative of whether the URL is malicious.

Example 2 includes the subject matter of Example 1, and wherein to analyze the URL based on ensemble lexical analysis comprises to analyze the URL based on multiple lexical analysis algorithms.

Example 3 includes the subject matter of any of Examples 1 and 2, and wherein to analyze the URL based on multiple lexical analysis algorithms comprises to analyze the URL based on a natural language processing algorithm and at least one representation learning algorithm.

Example 4 includes the subject matter of any of Examples 1-3, and wherein to analyze the URL using multiple lexical analysis algorithms comprises to analyze the URL based on a natural language processing algorithm to determine a first lexical analysis score; analyze the URL based on a deep learning algorithm to determine a second lexical analysis score; analyze the URL based on a non-parametric algorithm to determine a third lexical analysis score; and aggregate the first, second, and third lexical analysis scores to determine the first malicious classification score.

Example 5 includes the subject matter of any of Examples 1-4, and wherein to aggregate the first, second, and third lexical analysis score comprises to apply a majority vote to first, second, and third lexical analysis score to determine the first malicious classification score.

Example 6 includes the subject matter of any of Examples 1-5, and wherein to aggregate the first, second, and third lexical analysis score comprises to apply a Bayesian committee machine to first, second, and third lexical analysis score to determine the first malicious classification score.

Example 7 includes the subject matter of any of Examples 1-6, and wherein to analyze the URL based on third-party malicious URL detection results comprises to retrieve the third-party malicious URL detection results associated with the URL from a third-party server.

Example 8 includes the subject matter of any of Examples 1-7, and wherein to analyze the URL based on third-party malicious URL detection results comprises to retrieve third-party malicious URL detection results associated with the URL from multiple third-party sources; and aggregate the third-party malicious URL detection results to determine the second malicious classification score.

Example 9 includes the subject matter of any of Examples 1-8, and wherein the third-party malicious URL detection results comprises an indication of whether the URL is considered malicious by the third-party source.

Example 10 includes the subject matter of any of Examples 1-9, and wherein to analyze the metadata related to the URL comprises to determine the metadata related to the URL.

Example 11 includes the subject matter of any of Examples 1-10, and wherein the metadata related to the URL comprises at least one of (i) an identity of an internet protocol (IP) address corresponding to the URL and (ii) an indication of the popularity of the URL.

Example 12 includes the subject matter of any of Examples 1-11, and further comprising a URL additional analysis selector to determine whether to select the URL for additional analysis based on selection criteria not used in (i) the analysis of the URL using the ensemble lexical analysis, (ii) the analysis of the URL based on third-party URL metadata, and (iii) the analysis of the metadata related to the URL.

Example 13 includes the subject matter of any of Examples 1-12, and wherein the selection criteria comprises customer feedback related to a classification of the URL.

Example 14 includes the subject matter of any of Examples 1-13, and wherein the selection criteria comprises URL owner feedback related to a classification of the URL.

Example 15 includes the subject matter of any of Examples 1-14, and wherein the selection criteria comprises analysis of the URL based on an expanded whitelist or an expanded blacklist.

Example 16 includes the subject matter of any of Examples 1-15, and wherein the selection criteria comprises a determined level of risk to a customer for false classification of the URL.

Example 17 includes the subject matter of any of Examples 1-16, and wherein the selection criteria comprises a variance between the first, second, or third malicious classification score of the URL and a third-party malicious classification score for the URL.

Example 18 includes the subject matter of any of Examples 1-17, and wherein the selection criteria comprises a determined age of the URL.

Example 19 includes the subject matter of any of Examples 1-18, and wherein the selection criteria comprises (i) customer feedback related to a classification of the URL, (ii) URL owner feedback related to a classification of the URL, (iii) analysis of the URL using an expanded whitelist or an expanded blacklist, (iv) a determined level of risk to a customer for false classification of the URL, (v) a variance between the first, second, or third malicious classification score of the URL and a third-party malicious classification score for the URL, and (vi) a determined age of the URL.

Example 20 includes the subject matter of any of Examples 1-19, and further comprising a URL analysis manager to determine whether the URL is malicious based on at least one of the first malicious classification score, the second malicious classification score, and the third malicious classification score.

Example 21 includes the subject matter of any of Examples 1-20, and wherein to analyze the URL based on third-party malicious URL detection results comprises to analyze the URL based on the third-party malicious URL detection results to determine the second malicious classification score based on the first malicious classification score.

Example 22 includes the subject matter of any of Examples 1-21, and wherein to analyze the metadata related to the URL comprises to analyze the metadata related to the URL to determine the third malicious classification score based on the second malicious classification score.

Example 23 includes the subject matter of any of Examples 1-22, and further comprising a URL analysis manager to determine whether the first malicious classification score is ambiguous by determining whether the first malicious classification score falls within a reference score range; and train the URL lexical ensemble analyzer of the URL analysis system based on active learning applied to the URL in response to a determination that the first malicious classification score is ambiguous.

Example 24 includes the subject matter of any of Examples 1-23, and further comprising a URL analysis manager to determine whether the second malicious classification score is ambiguous by determining whether the second malicious classification score falls within a reference score range; and train the third-party detection analyzer of the URL analysis system based on active learning applied to the URL in response to a determination that the second malicious classification score is ambiguous.

Example 25 includes the subject matter of any of Examples 1-24, and further comprising a URL analysis manager to determine whether the second malicious classification score is ambiguous by determining whether the second malicious classification score falls within a reference score range; and train the third-party detection analyzer of the URL analysis system based on an online learning algorithm applied to the URL in response to a determination that the second malicious classification score is ambiguous.

Example 26 includes the subject matter of any of Examples 1-25, and further comprising a URL analysis manager to determine whether the third malicious classification score is ambiguous by determining whether the third malicious classification score falls within a reference score range; and train the local URL metadata analyzer of the URL analysis system based on active learning applied to the URL in response to a determination that the third malicious classification score is ambiguous.

Example 27 includes the subject matter of any of Examples 1-26, and further comprising a URL analysis manager to determine whether the third malicious classification score is ambiguous by determining whether the third malicious classification score falls within a reference score range; and train the local URL metadata analyzer of the URL analysis system based on an online learning algorithm applied to the URL in response to a determination that the third malicious classification score is ambiguous.

Example 28 includes a method for analyzing a Uniform Resource Locator (URL), the method comprising analyzing, by a URL analysis system, the URL using an ensemble lexical analysis to determine a first malicious classification score for the URL, wherein the first malicious classification score is indicative of whether the URL is malicious; determining, by the URL analysis system, whether the first malicious classification score satisfies a confidence threshold; analyzing, by the URL analysis system, the URL based on third-party malicious URL detection results associated with the URL and determined by a third-party source to determine a second malicious classification score for the URL in response to a determination that the first malicious classification score does not satisfy the confidence threshold, wherein the second malicious classification score is indicative of whether the URL is malicious; determining, by the URL analysis system, whether the second malicious classification score satisfies the confidence threshold; and analyzing, by the URL analysis system, metadata related to the URL to determine a third malicious classification score for the URL in response to a determination that the second malicious classification score does not satisfy the confidence threshold, wherein the third malicious classification score is indicative of whether the URL is malicious.

Example 29 includes the subject matter of Example 28, and wherein analyzing the URL using an ensemble lexical analysis comprises analyzing the URL using multiple lexical analysis algorithms.

Example 30 includes the subject matter of any of Examples 28 and 29, and wherein analyzing the URL using multiple lexical analysis algorithms comprises analyzing the URL using a natural language processing algorithm and at least one representation learning algorithm.

Example 31 includes the subject matter of any of Examples 28-30, and wherein analyzing the URL using multiple lexical analysis algorithms comprises analyzing the URL using a natural language processing algorithm to determine a first lexical analysis score; analyzing the URL using a deep learning algorithm to determine a second lexical analysis score; analyzing the URL using a nonparametric algorithm to determine a third lexical analysis score; and aggregating the first, second, and third lexical analysis scores to determine the first malicious classification score.

Example 32 includes the subject matter of any of Examples 28-31, and wherein aggregating the first, second, and third lexical analysis score comprises applying a majority vote to first, second, and third lexical analysis score to determine the first malicious classification score.

Example 33 includes the subject matter of any of Examples 28-32, and wherein aggregating the first, second, and third lexical analysis score comprises applying a Bayesian committee machine to first, second, and third lexical analysis score to determine the first malicious classification score.

Example 34 includes the subject matter of any of Examples 28-33, and wherein analyzing the URL based on third-party malicious URL detection results comprises retrieving the third-party malicious URL detection results associated with the URL from a third-party server.

Example 35 includes the subject matter of any of Examples 28-34, and wherein analyzing the URL based on third-party malicious URL detection results comprises retrieving third-party malicious URL detection results associated with the URL from multiple third-party sources; and aggregating the third-party malicious URL detection results to determine the second malicious classification score.

Example 36 includes the subject matter of any of Examples 28-35, and wherein the third-party malicious URL detection results comprises an indication of whether the URL is considered malicious by the third-party source.

Example 37 includes the subject matter of any of Examples 28-36, and wherein analyzing the metadata related to the URL comprises determining, by the URL analysis system, the metadata related to the URL.

Example 38 includes the subject matter of any of Examples 28-37, and wherein the metadata related to the URL comprises at least one of (i) an identity of an internet protocol (IP) address corresponding to the URL and (ii) an indication of the popularity of the URL.

Example 39 includes the subject matter of any of Examples 28-38, and further comprising determining whether to select the URL for additional analysis based on selection criteria not used in (i) the analysis of the URL using the ensemble lexical analysis, (ii) the analysis of the URL based on third-party URL metadata, and (iii) the analysis of the metadata related to the URL.

Example 40 includes the subject matter of any of Examples 28-39, and wherein determining whether to select the URL for additional analysis comprises determining whether to select the URL for additional analysis based on customer feedback related to a classification of the URL.

Example 41 includes the subject matter of any of Examples 28-40, and wherein determining whether to select the URL for additional analysis comprises determining whether to select the URL for additional analysis based on URL owner feedback related to a classification of the URL.

Example 42 includes the subject matter of any of Examples 28-41, and wherein determining whether to select the URL for additional analysis comprises determining whether to select the URL for additional analysis based on analysis of the URL using an expanded whitelist or an expanded blacklist.

Example 43 includes the subject matter of any of Examples 28-42, and wherein determining whether to select the URL for additional analysis comprises determining whether to select the URL for additional analysis based on a determined level of risk to a customer for false classification of the URL.

Example 44 includes the subject matter of any of Examples 28-43, and wherein determining whether to select the URL for additional analysis comprises determining whether to select the URL for additional analysis based on a variance between the first, second, or third malicious classification score of the URL and a third-party malicious classification score for the URL.

Example 45 includes the subject matter of any of Examples 28-44, and wherein determining whether to select the URL for additional analysis comprises determining whether to select the URL for additional analysis based on a determined age of the URL.

Example 46 includes the subject matter of any of Examples 28-45, and wherein determining whether to select the URL for additional analysis comprises determining whether to select the URL for additional analysis based on (i) customer feedback related to a classification of the URL, (ii) URL owner feedback related to a classification of the URL, (iii) analysis of the URL using an expanded whitelist or an expanded blacklist, (iv) a determined level of risk to a customer for false classification of the URL, (v) a variance between the first, second, or third malicious classification score of the URL and a third-party malicious classification score for the URL, and (vi) a determined age of the URL.

Example 47 includes the subject matter of any of Examples 28-46, and further comprising applying the additional analysis to the URL in response to a determination to select the URL for additional analysis, wherein applying the additional analysis comprises determining an updated malicious classification score for the URL based on the additional analysis.

Example 48 includes the subject matter of any of Examples 28-47, and further comprising determining whether the URL is malicious based on at least one of the first malicious classification score, the second malicious classification score, the third malicious classification score, or the updated malicious classification score.

Example 49 includes the subject matter of any of Examples 28-48, and further comprising determining whether the URL is malicious based on at least one of the first malicious classification score, the second malicious classification score, and the third malicious classification score.

Example 50 includes the subject matter of any of Examples 28-49, and wherein analyzing the URL based on third-party malicious URL detection results comprises analyzing the URL based on third-party malicious URL detection results to determine the second malicious classification score based on the first malicious classification score.

Example 51 includes the subject matter of any of Examples 28-50, and wherein analyzing the metadata related to the URL comprises analyzing the metadata related to the URL to determine the third malicious classification score based on the second malicious classification score.

Example 52 includes the subject matter of any of Examples 28-51, and further comprising determining, by the URL analysis system, whether the first malicious classification score is ambiguous by determining whether the first malicious classification score falls within a reference score range; and training a URL lexical ensemble analyzer of the URL analysis system based on active learning applied to the URL in response to a determination that the first malicious classification score is ambiguous.

Example 53 includes the subject matter of any of Examples 28-52, and further comprising determining, by the URL analysis system, whether the second malicious classification score is ambiguous by determining whether the second malicious classification score falls within a reference score range; and training a third-party detection analyzer of the URL analysis system based on active learning applied to the URL in response to a determination that the second malicious classification score is ambiguous.

Example 54 includes the subject matter of any of Examples 28-53, and further comprising determining, by the URL analysis system, whether the second malicious classification score is ambiguous by determining whether the second malicious classification score falls within a reference score range; and training a third-party detection analyzer of the URL analysis system based on an online learning algorithm applied to the URL in response to a determination that the second malicious classification score is ambiguous.

Example 55 includes the subject matter of any of Examples 28-54, and further comprising determining, by the URL analysis system, whether the third malicious classification score is ambiguous by determining whether the third malicious classification score falls within a reference score range; and training a local URL metadata analyzer of the URL analysis system based on active learning applied to the URL in response to a determination that the third malicious classification score is ambiguous.

Example 56 includes the subject matter of any of Examples 28-55, and further comprising determining, by the URL analysis system, whether the third malicious classification score is ambiguous by determining whether the third malicious classification score falls within a reference score range; and training a local URL metadata analyzer of the URL analysis system based on an online learning algorithm applied to the URL in response to a determination that the third malicious classification score is ambiguous.

Example 57 includes one or more machine-readable storage media comprising a plurality of instructions stored thereon that, when executed, cause a compute device to perform the method of any of Examples 28-56.

Example 58 includes a compute device for Uniform Resource Locator (URL) analysis, the compute device comprising means for analyzing the URL using an ensemble lexical analysis to determine a first malicious classification score for the URL, wherein the first malicious classification score is indicative of whether the URL is malicious; means for determining whether the first malicious classification score satisfies a confidence threshold; means for analyzing the URL based on third-party malicious URL detection results associated with the URL and determined by a third-party source to determine a second malicious classification score for the URL in response to a determination that the first malicious classification score does not satisfy the confidence threshold, wherein the second malicious classification score is indicative of whether the URL is malicious; means for determining whether the second malicious classification score satisfies the confidence threshold; and means for analyzing, metadata related to the URL to determine a third malicious classification score for the URL in response to a determination that the second malicious classification score does not satisfy the confidence threshold, wherein the third malicious classification score is indicative of whether the URL is malicious.

Example 59 includes the subject matter of Example 58, and wherein the means for wherein analyzing the URL using an ensemble lexical analysis comprises means for analyzing the URL using multiple lexical analysis algorithms.

Example 60 includes the subject matter of any of Examples 58 and 59, and wherein the means for analyzing the URL using multiple lexical analysis algorithms comprises means for analyzing the URL using a natural language processing algorithm and at least one representation learning algorithm.

Example 61 includes the subject matter of any of Examples 58-60, and wherein means for analyzing the URL using multiple lexical analysis algorithms comprises means for analyzing the URL using a natural language processing algorithm to determine a first lexical analysis score; means for analyzing the URL using a deep learning algorithm to determine a second lexical analysis score; means for analyzing the URL using a non-parametric algorithm to determine a third lexical analysis score; and means for aggregating the first, second, and third lexical analysis scores to determine the first malicious classification score.

Example 62 includes the subject matter of any of Examples 58-61, and wherein the means for aggregating the first, second, and third lexical analysis score comprises means for applying a majority vote to first, second, and third lexical analysis score to determine the first malicious classification score.

Example 63 includes the subject matter of any of Examples 58-62, and wherein the means for aggregating the first, second, and third lexical analysis score comprises means for applying a Bayesian committee machine to first, second, and third lexical analysis score to determine the first malicious classification score.

Example 64 includes the subject matter of any of Examples 58-63, and wherein the means for analyzing the URL based on third-party malicious URL detection results comprises means for retrieving the third-party malicious URL detection results associated with the URL from a third-party server.

Example 65 includes the subject matter of any of Examples 58-64, and wherein the means for analyzing the URL based on third-party malicious URL detection results comprises means for retrieving third-party malicious URL detection results associated with the URL from multiple third-party sources; and means for aggregating the third-party malicious URL detection results to determine the second malicious classification score.

Example 66 includes the subject matter of any of Examples 58-65, and wherein the third-party malicious URL detection results comprises an indication of whether the URL is considered malicious by the third-party source.

Example 67 includes the subject matter of any of Examples 58-66, and wherein the means for analyzing the metadata related to the URL comprises means for determining the metadata related to the URL.

Example 68 includes the subject matter of any of Examples 58-67, and wherein the metadata related to the URL comprises at least one of (i) an identity of an internet protocol (IP) address corresponding to the URL and (ii) an indication of the popularity of the URL.

Example 69 includes the subject matter of any of Examples 58-68, and further comprising means for determining whether to select the URL for additional analysis based on selection criteria not used in (i) the analysis of the URL using the ensemble lexical analysis, (ii) the analysis of the URL based on third-party URL metadata, and (iii) the analysis of the metadata related to the URL.

Example 70 includes the subject matter of any of Examples 58-69, and wherein the means for determining whether to select the URL for additional analysis comprises means for determining whether to select the URL for additional analysis based on customer feedback related to a classification of the URL.

Example 71 includes the subject matter of any of Examples 58-70, and wherein the means for determining whether to select the URL for additional analysis comprises means for determining whether to select the URL for additional analysis based on URL owner feedback related to a classification of the URL.

Example 72 includes the subject matter of any of Examples 58-71, and wherein the means for determining whether to select the URL for additional analysis comprises means for determining whether to select the URL for additional analysis based on analysis of the URL using an expanded whitelist or an expanded blacklist.

Example 73 includes the subject matter of any of Examples 58-72, and wherein the means for determining whether to select the URL for additional analysis comprises means for determining whether to select the URL for additional analysis based on a determined level of risk to a customer for false classification of the URL.

Example 74 includes the subject matter of any of Examples 58-73, and wherein the means for determining whether to select the URL for additional analysis comprises means for determining whether to select the URL for additional analysis based on a variance between the first, second, or third malicious classification score of the URL and a third-party malicious classification score for the URL.

Example 75 includes the subject matter of any of Examples 58-74, and wherein the means for determining whether to select the URL for additional analysis comprises means for determining whether to select the URL for additional analysis based on a determined age of the URL.

Example 76 includes the subject matter of any of Examples 58-75, and wherein the means for determining whether to select the URL for additional analysis comprises means for determining whether to select the URL for additional analysis based on (i) customer feedback related to a classification of the URL, (ii) URL owner feedback related to a classification of the URL, (iii) analysis of the URL using an expanded whitelist or an expanded blacklist, (iv) a determined level of risk to a customer for false classification of the URL, (v) a variance between the first, second, or third malicious classification score of the URL and a third-party malicious classification score for the URL, and (vi) a determined age of the URL.

Example 77 includes the subject matter of any of Examples 58-76, and further comprising means for applying the additional analysis to the URL in response to a determination to select the URL for additional analysis, wherein the means for applying the additional analysis comprises means for determining an updated malicious classification score for the URL based on the additional analysis.

Example 78 includes the subject matter of any of Examples 58-77, and further comprising means for determining whether the URL is malicious based on at least one of the first malicious classification score, the second malicious classification score, the third malicious classification score, or the updated malicious classification score.

Example 79 includes the subject matter of any of Examples 58-78, and further comprising means for determining whether the URL is malicious based on at least one of the first malicious classification score, the second malicious classification score, and the third malicious classification score.

Example 80 includes the subject matter of any of Examples 58-79, and wherein the means for analyzing the URL based on third-party malicious URL detection results comprises means for analyzing the URL based on third-party malicious URL detection results to determine the second malicious classification score based on the first malicious classification score.

Example 81 includes the subject matter of any of Examples 58-80, and wherein the means for analyzing the metadata related to the URL comprises means for analyzing the metadata related to the URL to determine the third malicious classification score based on the second malicious classification score.

Example 82 includes the subject matter of any of Examples 58-81, and further comprising means for determining whether the first malicious classification score is ambiguous by determining whether the first malicious classification score falls within a reference score range; and means for training a URL lexical ensemble analyzer of a URL analysis system based on active learning applied to the URL in response to a determination that the first malicious classification score is ambiguous.

Example 83 includes the subject matter of any of Examples 58-82, and further comprising means for determining whether the second malicious classification score is ambiguous by determining whether the second malicious classification score falls within a reference score range; and means for training a third-party detection analyzer of a URL analysis system based on active learning applied to the URL in response to a determination that the second malicious classification score is ambiguous.

Example 84 includes the subject matter of any of Examples 58-83, and further comprising means for determining whether the second malicious classification score is ambiguous by determining whether the second malicious classification score falls within a reference score range; and means for training a third-party detection analyzer of a URL analysis system based on an online learning algorithm applied to the URL in response to a determination that the second malicious classification score is ambiguous.

Example 85 includes the subject matter of any of Examples 58-84, and further comprising means for determining whether the third malicious classification score is ambiguous by determining whether the third malicious classification score falls within a reference score range; and means for training a local URL metadata analyzer of a URL analysis system based on active learning applied to the URL in response to a determination that the third malicious classification score is ambiguous.

Example 86 includes the subject matter of any of Examples 58-85, and further comprising means for determining whether the third malicious classification score is ambiguous by determining whether the third malicious classification score falls within a reference score range; and means for training a local URL metadata analyzer of a URL analysis system based on an online learning algorithm applied to the URL in response to a determination that the third malicious classification score is ambiguous.

The invention claimed is:

1. A Uniform Resource Locator (URL) analysis system to analyze a URL, the URL analysis system comprising:
a hardware processor; and
a memory having instructions stored therein that, when executed by the hardware processor, cause the URL analysis system to establish a URL lexical ensemble analyzer, a third-party detection analyzer, a local URL metadata analyzer, and a URL additional analysis selector, wherein:
the URL lexical ensemble analyzer is to (i) analyze the URL based on an ensemble lexical analysis to determine a first malicious classification score for the URL, wherein the first malicious classification score is indicative of whether the URL is malicious and (ii) determining whether the first malicious classification score satisfies a confidence threshold;
the third-party detection analyzer is to (i) analyze the URL based on third-party malicious URL detection results associated with the URL and determined by a third-party source to determine a second malicious classification score for the URL in response to a determination that the first malicious classification score does not satisfy the confidence threshold, wherein the second malicious classification score is indicative of whether the URL is malicious and (ii) determine whether the second malicious classification score satisfies the confidence threshold;
the local URL metadata analyzer is to analyze metadata related to the URL to determine a third malicious classification score for the URL in response to a determination that the second malicious classification score does not satisfy the confidence threshold, wherein the third malicious classification score is indicative of whether the URL is malicious; and
the URL additional analysis selector is to determine whether to select the URL for additional analysis based on selection criteria not used in (i) the analysis of the URL using the ensemble lexical analysis, (ii) the analysis of the URL based on third-party URL metadata, and (iii) the analysis of the metadata related to the URL.

2. The URL analysis system of claim 1, wherein to analyze the URL based on an ensemble lexical analysis comprises to:
analyze the URL based on a natural language processing algorithm to determine a first lexical analysis score;
analyze the URL based on a deep learning algorithm to determine a second lexical analysis score;
analyze the URL based on a non-parametric algorithm to determine a third lexical analysis score; and
aggregate the first, second, and third lexical analysis scores to determine the first malicious classification score.

3. The URL analysis system of claim 1, wherein the third-party malicious URL detection results comprises an indication of whether the URL is considered malicious by the third-party source.

4. The URL analysis system of claim 1, wherein the selection criteria comprises (i) customer feedback related to a classification of the URL, (ii) URL owner feedback related to a classification of the URL, (iii) analysis of the URL using an expanded whitelist or an expanded blacklist, (iv) a determined level of risk to a customer for false classification of the URL, (v) a variance between the first, second, or third malicious classification score of the URL and a third-party malicious classification score for the URL, and (vi) a determined age of the URL.

5. The URL analysis system of claim 1, further comprising a URL analysis manager to determine whether the URL is malicious based on at least one of the first malicious classification score, the second malicious classification score, and the third malicious classification score.

6. The URL analysis system of claim 1, further comprising a URL analysis manager to:
determine whether the first malicious classification score is ambiguous by determining whether the first malicious classification score falls within a reference score range; and
train the URL lexical ensemble analyzer of the URL analysis system based on active learning applied to the URL in response to a determination that the first malicious classification score is ambiguous.

7. The URL analysis system of claim 1, further comprising a URL analysis manager to:
determine whether the second malicious classification score is ambiguous by determining whether the second malicious classification score falls within a reference score range; and train the third-party detection analyzer of the URL analysis system based on active learning or an online algorithm applied to the URL in response to a determination that the second malicious classification score is ambiguous.

8. The URL analysis system of claim 1, further comprising a URL analysis manager to:
   determine whether the third malicious classification score is ambiguous by determining whether the third malicious classification score falls within a reference score range; and
   train the local URL metadata analyzer of the URL analysis system based on active learning or an online algorithm applied to the URL in response to a determination that the third malicious classification score is ambiguous.

9. A method for analyzing a Uniform Resource Locator (URL), the method comprising:
   analyzing, by a URL analysis system, the URL using an ensemble lexical analysis to determine a first malicious classification score for the URL, wherein the first malicious classification score is indicative of whether the URL is malicious;
   determining, by the URL analysis system, whether the first malicious classification score satisfies a confidence threshold;
   analyzing, by the URL analysis system, the URL based on third-party malicious URL detection results associated with the URL and determined by a third-party source to determine a second malicious classification score for the URL in response to a determination that the first malicious classification score does not satisfy the confidence threshold, wherein the second malicious classification score is indicative of whether the URL is malicious;
   determining, by the URL analysis system, whether the second malicious classification score satisfies the confidence threshold;
   analyzing, by the URL analysis system, metadata related to the URL to determine a third malicious classification score for the URL in response to a determination that the second malicious classification score does not satisfy the confidence threshold, wherein the third malicious classification score is indicative of whether the URL is malicious; and
   determining whether to select the URL for additional analysis based on selection criteria not used in (i) the analysis of the URL using the ensemble lexical analysis, (ii) the analysis of the URL based on third-party URL metadata, and (iii) the analysis of the metadata related to the URL.

10. The method of claim 9, wherein analyzing the URL using an ensemble lexical analysis comprises analyzing the URL using multiple lexical analysis algorithms.

11. The method of claim 10, wherein analyzing the URL using multiple lexical analysis algorithms comprises:
   analyzing the URL using a natural language processing algorithm to determine a first lexical analysis score;
   analyzing the URL using a deep learning algorithm to determine a second lexical analysis score;
   analyzing the URL using a non-parametric algorithm to determine a third lexical analysis score; and
   aggregating the first, second, and third lexical analysis scores to determine the first malicious classification score.

12. The method of claim 9, wherein the third-party malicious URL detection results comprises an indication of whether the URL is considered malicious by the third-party source.

13. The method of claim 11, wherein determining whether to select the URL for additional analysis comprises determining whether to select the URL for additional analysis based on (i) customer feedback related to a classification of the URL, URL owner feedback related to a classification of the URL, (iii) analysis of the URL using an expanded whitelist or an expanded blacklist, (iv) a determined level of risk to a customer for false classification of the URL, (v) a variance between the first, second, or third malicious classification score of the URL and a third-party malicious classification score for the URL, and (vi) a determined age of the URL.

14. The method of claim 9, further comprising applying the additional analysis to the URL in response to a determination to select the URL for additional analysis, wherein applying the additional analysis comprises determining an updated malicious classification score for the URL based on the additional analysis.

15. The method of claim 13, further comprising determining whether the URL is malicious based on at least one of the first malicious classification score, the second malicious classification score, the third malicious classification score, or the updated malicious classification score.

16. One or more non-transitory, machine-readable storage media comprising a plurality of instructions stored thereon that, when executed, cause a compute device to:
   analyze the URL using an ensemble lexical analysis to determine a first malicious classification score for the URL, wherein the first malicious classification score is indicative of whether the URL is malicious;
   determine whether the first malicious classification score satisfies a confidence threshold;
   analyze the URL based on third-party malicious URL detection results associated with the URL and determined by a third-party source to determine a second malicious classification score for the URL in response to a determination that the first malicious classification score does not satisfy the confidence threshold, wherein the second malicious classification score is indicative of whether the URL is malicious;
   determine whether the second malicious classification score satisfies the confidence threshold;
   analyze metadata related to the URL to determine a third malicious classification score for the URL in response to a determination that the second malicious classification score does not satisfy the confidence threshold, wherein the third malicious classification score is indicative of whether the URL is malicious; and
   determining whether to select the URL for additional analysis based on selection criteria not used in (i) the analysis of the URL using the ensemble lexical analysis, (ii) the analysis of the URL based on third-party URL metadata, and (iii) the analysis of the metadata related to the URL.

17. The one or more non-transitory, machine-readable storage media of claim 16, wherein to analyze the URL using an ensemble lexical analysis comprises to analyze the URL using multiple lexical analysis algorithms.

18. The one or more non-transitory, machine-readable storage media of claim 17, wherein to analyze the URL using multiple lexical analysis algorithms comprises to:
   analyze the URL using a natural language processing algorithm to determine a first lexical analysis score;

analyze the URL using a deep learning algorithm to determine a second lexical analysis score;

analyze the URL using a non-parametric algorithm to determine a third lexical analysis score; and aggregate the first, second, and third lexical analysis scores to determine the first malicious classification score.

19. The one or more non-transitory, machine-readable storage media of claim 16, wherein the third-party malicious URL detection results comprises an indication of whether the URL is considered malicious by the third-party source.

20. The one or more non-transitory, machine-readable storage media of claim 16, wherein to determine whether to select the URL for additional analysis comprises to determine whether to select the URL for additional analysis based on (i) customer feedback related to a classification of the URL, (ii) URL owner feedback related to a classification of the URL, (iii) analysis of the URL using an expanded whitelist or an expanded blacklist, (iv) a determined level of risk to a customer for false classification of the URL, (v) a variance between the first, second, or third malicious classification score of the URL and a third-party malicious classification score for the URL, and (vi) a determined age of the URL.

21. The one or more non-transitory, machine-readable storage media of claim 16, wherein the plurality of instructions, when executed, further cause a compute device to apply the additional analysis to the URL in response to a determination to select the URL for additional analysis, wherein to apply the additional analysis comprises to determine an updated malicious classification score for the URL based on the additional analysis.

22. The one or more non-transitory, machine-readable storage media of claim 21, wherein the plurality of instructions, when executed, further cause a compute device to determine whether the URL is malicious based on at least one of the first malicious classification score, the second malicious classification score, the third malicious classification score, or the updated malicious classification score.

* * * * *